(12) United States Patent
Robuck

(10) Patent No.: US 6,889,808 B2
(45) Date of Patent: May 10, 2005

(54) POSITIVE LOCKING OVERRUNNING CLUTCH MECHANISM

(75) Inventor: Mark Joseph Robuck, Chadds Ford, PA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/326,326

(22) Filed: Dec. 20, 2002

(65) Prior Publication Data

US 2004/0118654 A1 Jun. 24, 2004

(51) Int. Cl.$^7$ ............................................. F16D 41/12
(52) U.S. Cl. .................................... 192/46; 192/114 R
(58) Field of Search ............................. 192/41 R, 45.1, 192/46, 71, 72, 114 R; 188/82.4; 74/576

(56) References Cited

U.S. PATENT DOCUMENTS

| | | | | |
|---|---|---|---|---|
| 2,137,643 A | * | 11/1938 | Cirac et al. .................. | 74/576 |
| 4,137,798 A | | 2/1979 | Sisk et al. | |
| 4,771,872 A | * | 9/1988 | Kampf ........................ | 192/28 |
| 4,811,655 A | | 3/1989 | Janiszewski | |
| 5,205,386 A | * | 4/1993 | Goodman et al. ............ | 192/46 |
| 5,765,669 A | | 6/1998 | Adams et al. | |
| 6,044,944 A | | 4/2000 | Adams et al. | |
| 6,202,813 B1 | * | 3/2001 | Yahata et al. ................ | 192/64 |
| 6,516,931 B2 | * | 2/2003 | Kroger ........................ | 192/46 |

OTHER PUBLICATIONS

*Epilogics Technology Introduction*, Epilogics Downloaded from www.epilogics.com/md/tekintro.htm on Sep. 24, 2001 at 3:21p.m.

* cited by examiner

Primary Examiner—Richard M. Lorence
(74) Attorney, Agent, or Firm—Thompson Coburn LLP

(57) ABSTRACT

A positive locking overrunning clutch mechanism comprising an inner clutch member, an outer clutch member, and a locking mechanism. The clutch members are adapted to rotate about a clutch axis. The locking mechanism has a plurality of lock portions adapted to transfer torque load from the inner clutch member to the outer clutch member. The locking mechanism is moveable between a locked position and an unlocked position. In the locked position, the lock portions simultaneously engage the inner and outer clutch members in a manner to cause the outer clutch member to rotate with the inner clutch member upon rotation of the inner clutch member about the clutch axis in a first rotational direction. In the unlocked position, the lock portions are positioned relative to the inner and outer clutch members in a manner to permit rotation of the outer clutch member relative to the inner clutch member in the first rotational direction. Each lock portion is a first radial distance from the clutch axis when the locking mechanism is in the locked position and a second radial distance from the clutch axis when the locking mechanism is in the unlocked position. One of the inner and outer clutch members has a plurality of retaining portions adapted to engage the lock portions of the locking mechanism in a manner to positively maintain the locking mechanism in the unlocked position.

24 Claims, 3 Drawing Sheets

POSITIVE LOCKING OVERRUNNING CLUTCH MECHANISM

BACKGROUND OF THE INVENTION

Overrunning clutches are integral to helicopter drive systems, automotive transmissions, and many other applications. In helicopter drive trains, overrunning clutches permit the main rotors to continue to rotate in the event of engine failure.

Conventional clutch configurations use friction and high contact stresses as means for transferring load through the clutch. The generated friction is affected by lubricant properties and temperatures. Such conventional clutches are susceptible to wear, operational problems with unreliable engagements, and even catastrophic failure. They are also heavy because of the thickness and surface area of the components required to carry the torque load with friction.

SUMMARY OF THE INVENTION

One aspect of the present invention is a positive locking overrunning clutch mechanism comprising an inner clutch member, an outer clutch member, and a locking mechanism. The inner clutch member is adapted to rotate about a clutch axis. The outer clutch member is adapted to rotate about the clutch axis. The locking mechanism has a plurality of lock portions adapted to transfer torque load from one of the inner and outer clutch members to the other of the inner and outer clutch members. The one of the inner and outer clutch members comprises a drive clutch member and the other of the inner and outer clutch members comprises a driven clutch member. The locking mechanism is moveable between a locked position and an unlocked position. The locked position is a position in which the lock portions simultaneously engage the drive clutch member and the driven clutch member in a manner to cause the driven clutch member to rotate with the drive clutch member upon rotation of the drive clutch member about the clutch axis in a first rotational direction. The unlocked position is a position in which the lock portions are positioned relative to the drive and driven clutch members in a manner to permit rotation of the driven clutch member relative to the drive clutch member in the first rotational direction. Each lock portion is a first radial distance from the clutch axis when the locking mechanism is in the locked position. Each lock portion is a second radial distance from the clutch axis when the locking mechanism is in the unlocked position. One of the drive and driven clutch members has a plurality of retaining portions adapted to engage the lock portions of the locking mechanism in a manner to positively maintain the locking mechanism in the unlocked position.

Another aspect of the present invention is a positive locking overrunning clutch mechanism comprising an inner clutch member, an outer clutch member, and a locking mechanism. The inner clutch member is adapted to rotate about a clutch axis. The outer clutch member is adapted to rotate about the clutch axis. The outer clutch member circumscribes the inner clutch member. The locking mechanism has a plurality of lock portions adapted to transfer torque load from the inner clutch member to the outer clutch member. The locking mechanism is moveable between a locked position and an unlocked position. The locked position is a position in which the lock portions simultaneously engage the inner and outer clutch members in a manner to cause the outer clutch member to rotate with the inner clutch member upon rotation of the inner clutch member about the clutch axis in a first rotational direction. The unlocked position is a position in which the lock portions are positioned relative to the inner and outer clutch members in a manner to permit rotation of the outer clutch member relative to the inner clutch member in the first rotational direction. Each lock portion is a first radial distance from the clutch axis when the locking mechanism is in the locked position. Each lock portion is a second radial distance from the clutch axis when the locking mechanism is in the unlocked position. One of the inner and outer clutch members has a plurality of retaining portions adapted to engage the lock portions of the locking mechanism in a manner to positively maintain the locking mechanism in the unlocked position.

Other features and advantages will be in part apparent and in part pointed out hereinafter.

BRIEF DESCRIPTION OF THE DRAWINGS

Corresponding reference characters indicate corresponding parts throughout the several views of the drawings.

DETAILED DESCRIPTION OF THE PREFERRED EMBODIMENTS

Figure 1:
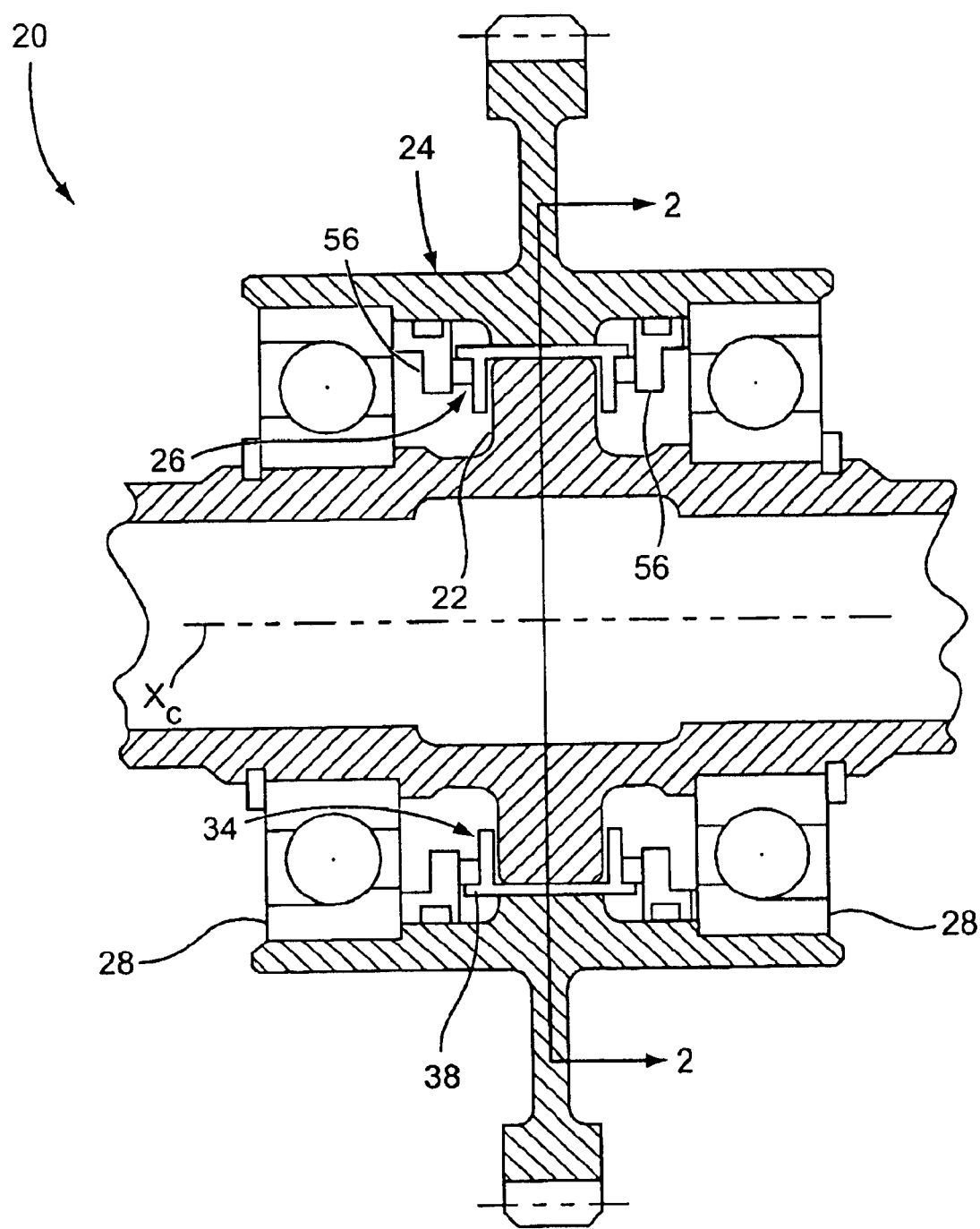
FIG. 1 is a longitudinal sectional view of a positive locking overrunning clutch mechanism of the present invention, the clutch mechanism having an inner clutch member, an outer clutch member, and a locking mechanism.
Figure 3:
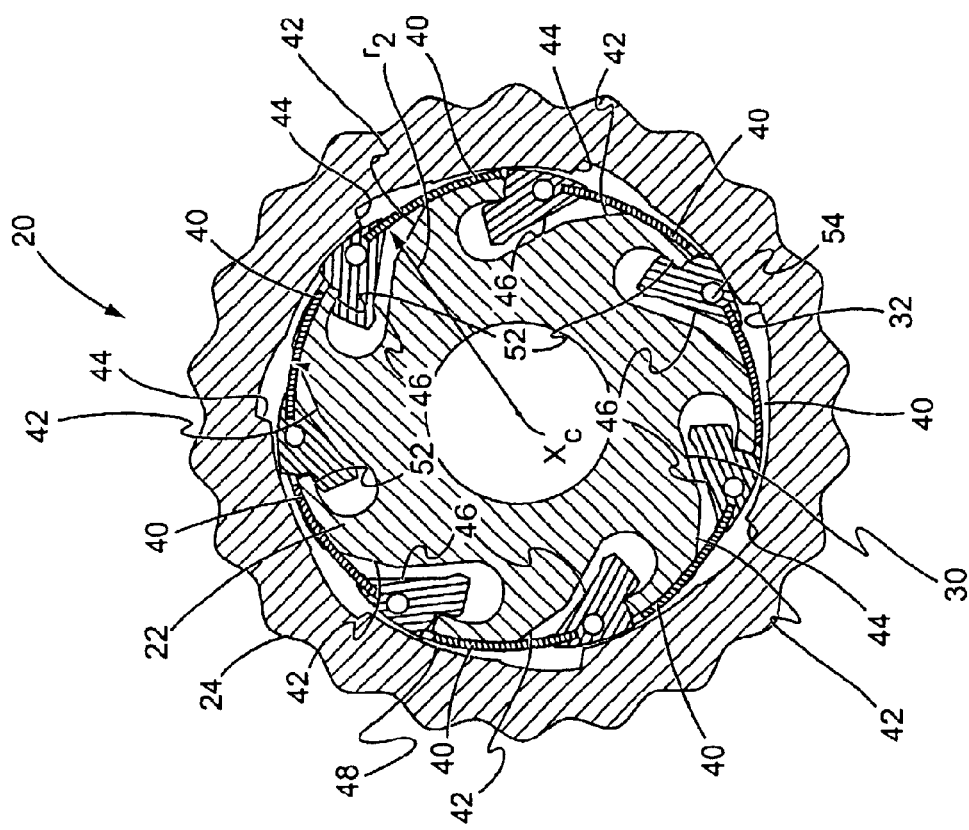
FIG. 3 is a lateral sectional view similar to FIG. 2, but showing the locking mechanism in an unlocked position.
Figure 2:
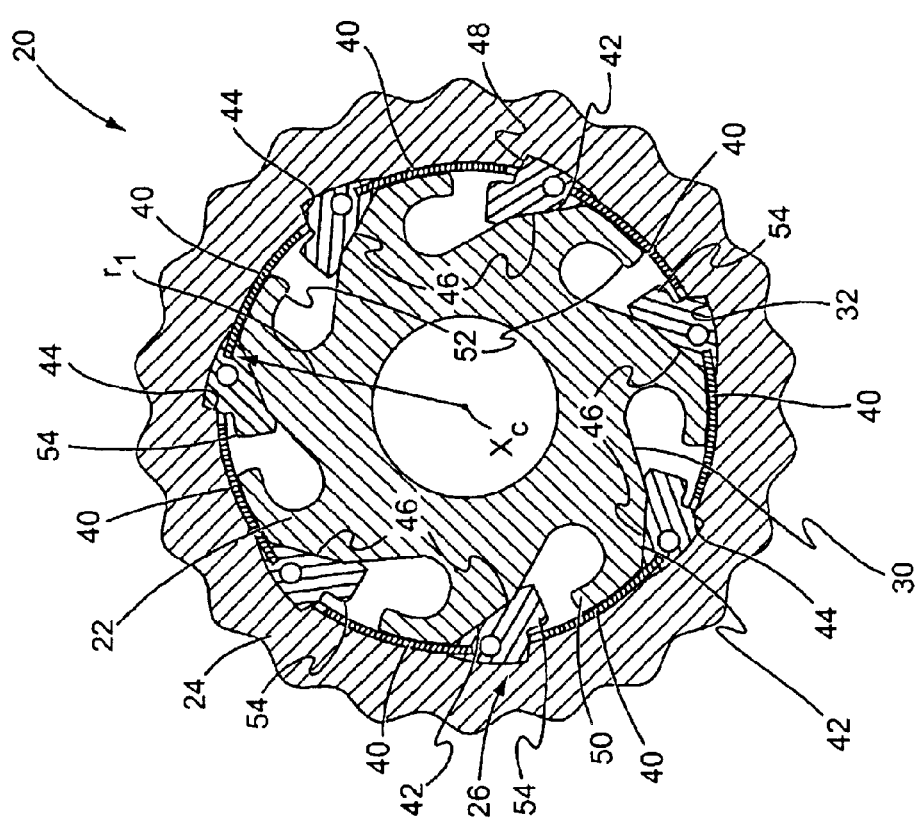
FIG. 2 is a lateral sectional view of the clutch mechanism of FIG. 1 taken along a plane of line 2—2 of FIG. 1, the locking mechanism being in a locked position.

Referring now to the drawings, and more particularly to FIGS. 1–3, a positive locking overrunning clutch mechanism of the present invention is indicated in its entirety by the reference numeral 20. The clutch mechanism 20 comprises an inner clutch member, generally indicated at 22, an outer clutch member, generally indicated at 24, and a locking mechanism, generally indicated at 26. The inner clutch member 22 is adapted to rotate about a clutch axis $X_c$. Preferably, the outer clutch member 24 circumscribes the inner clutch member 22 and is journaled to the inner clutch member via suitable bearings 28 (FIG. 1) for rotation relative to the inner clutch member about the clutch axis $X_c$.

Figure 4:
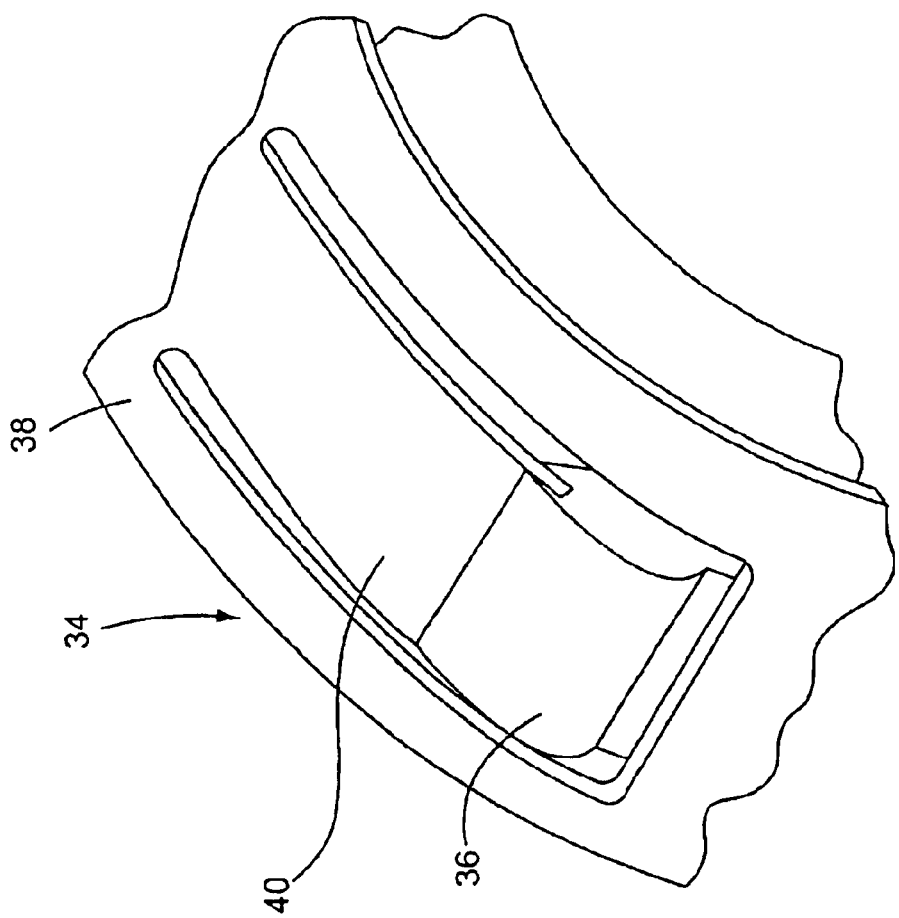
FIG. 4 is a fragmented perspective view of the locking mechanism of FIG. 1.

Preferably, the inner clutch member 22 has an outer peripheral surface 30 which is non-circular with respect to the clutch axis $X_c$ as viewed in a cross-section taken in a plane perpendicular to the clutch axis (FIGS. 2 and 3). Also preferably, the outer clutch member 24 has an inner peripheral surface 32 which is non-circular with respect to the clutch axis $X_c$ as viewed in a cross-section taken in a plane perpendicular to the clutch axis $X_c$ (FIGS. 2 and 3). The locking mechanism 26 comprises a cage 34 and a plurality of lock portions 36. Preferably, the cage 34 circumscribes the outer peripheral surface 30 of the inner clutch member 22 and is circumscribed by the inner peripheral surface 32 of the outer clutch member 24. As shown in FIG. 4, the cage 34 comprises a cage body 38 and a plurality of flexure elements 40. Each flexure element 40 has a first end secured to the cage body 38 and a second end secured to one of the lock portions 36. As shown in FIG. 4, the flexure elements 40 and the cage body 38 may constitute a single unitary member. The lock portions 36 are adapted to transfer torque load from one of the inner and outer clutch members 22, 24 (i.e., from a drive clutch member) to the other of the inner and outer clutch members (i.e., to a driven clutch member).

The locking mechanism 26 is moveable between a locked position (shown in FIG. 2) and an unlocked position (shown in FIG. 3). The locked position is a position in which the lock portions 36 simultaneously engage the inner clutch member 22 and the outer clutch member 24 in a manner to lock the clutch members together such that rotation of one of the clutch members in one direction causes rotation of the other clutch member in that direction. In other words, with the locking mechanism 26 in its locked position as shown in FIG. 2, counterclockwise movement of the inner clutch member 22 about the clutch axis $X_c$ causes the outer clutch member 24 to rotate with the inner clutch member. Likewise, with the locking mechanism 26 in its locked position as shown in FIG. 2, clockwise movement of the outer clutch member 24 about the clutch axis $X_c$ causes the inner clutch member 22 to rotate with the outer clutch member. The unlocked position (FIG. 3) of the locking mechanism 26 is a position in which the lock portions are positioned relative to the inner and outer clutch members 22, 24 in a manner to permit rotation of the outer clutch mechanism relative to the inner clutch mechanism about the clutch axis $X_c$ in one direction (e.g., counterclockwise in FIG. 3). In other words, with the locking mechanism 26 in its unlocked position (FIG. 3) and with the inner clutch member 22 stationary, the outer clutch mechanism 24 is free to rotate counterclockwise. Likewise, with the locking mechanism 26 in its unlocked position (FIG. 3) and with the outer clutch member 24 stationary, the inner clutch mechanism 22 is free to rotate clockwise. Each lock portion 36 is a first radial distance $r_1$ from the clutch axis $X_c$ when the locking mechanism 26 is in the locked position (FIG. 2) and is a second radial distance $r_2$ from the clutch axis $X_c$ when the locking mechanism is in the unlocked position (FIG. 3). The second ends of the flexure elements 40 move relative to the cage body 38 as the locking mechanism 26 is moved between its locked and unlocked positions.

Referring to FIGS. 2 and 3, the outer peripheral surface 30 of the inner clutch member 22 preferably includes a plurality ramp portions 42 and the inner peripheral surface 32 of the outer clutch member 24 preferably includes a plurality of lock-receiving shoulders 44. Each of the lock portions 36 includes an inner-clutch engaging surface 46 and an outer-clutch engaging surface 48. The inner-clutch engaging surface 46 of each lock portion 36 is adapted to engage one of the ramp portions 42 of the outer peripheral surface 30 of the inner clutch member 22. The outer-clutch engaging surface 48 of each lock portion 36 is adapted to engage one of the lock-receiving shoulders 44 of the inner peripheral surface 32 of the outer clutch member 24. With the locking mechanism 26 in its locked position (FIG. 2), the ramp portions 42 of the inner clutch member 22 engage the inner-clutch engaging surfaces 46 of the lock portions 36 and the outer-clutch engaging surfaces 48 of the lock portions engage the lock-receiving shoulders 44 of the outer clutch member 24 in a manner such that counter-clockwise rotation of the inner clutch member causes counter-clockwise rotation of the outer clutch member. Preferably, the lock-receiving shoulders 44 are involute surfaces. Also preferably, the outer-clutch engaging surfaces of the lock portions 36 and the lock-receiving shoulders 44 of the outer clutch member 24 are shaped such that the driving forces exerted by each lock-receiving shoulder 44 on its corresponding outer-clutch engaging surface 48 is substantially tangent to the circumferential movement of such lock-receiving shoulder. In other words, each lock-receiving shoulder 44 preferably exerts a driving force at a contact point on one of the outer-clutch engaging surfaces within thirty degrees of a tangent at a point on a circle about the axis $X_c$, where such point on the circle is the contact point. Because of the configuration of the clutch mechanism 20, substantially less stresses are exerted on the clutch members than with sprag clutches or other types of friction clutches. Thus, the clutch members may be made lighter than conventional clutch members. Also, each lock portion 36 may be formed with a hole or void to reduce the weight of the lock portion.

Referring still to FIGS. 2 and 3, the inner clutch member 22 preferably includes a plurality of retaining portions 50 adapted to engage the lock portions 36 of the locking mechanism 26 in a manner to positively maintain the locking mechanism in the unlocked position (FIG. 3). Preferably, each retaining portion 50 includes an engaging surface 52 generally facing radially inwardly (i.e., toward the clutch axis $X_c$), and each of the lock portions 36 includes a retainer engageable surface 54 generally facing radially outwardly (i.e., away from the clutch axis $X_c$). The engaging surface 52 of each retaining portion 50 is adapted to abut the retainer engageable surface 54 of a corresponding one of the lock portions 36 to maintain the locking mechanism 26 in the unlocked position.

Referring again to FIG. 1, the clutch mechanism 20 preferably includes suitable seals 56 adapted to enable the clutch mechanism to be oil filled or oil lubricated to provide lubrication during all operational modes, but particularly during transitional periods (i.e., relative movement of the locking mechanism 26 between its locked and unlocked positions) and overrunning. Preferably, the lock portions are lifted from contact with the outer clutch member 24 by a hydrodynamic film of lubricant during transitional periods when the rotational speeds of the inner and outer clutch members 22, 24 are sufficiently different.

During operation, counterclockwise rotation of the inner clutch member 22 about the clutch axis $X_c$ (assuming the locking mechanism 26 is initially in its unlocked position) causes the ramp portions 42 of the inner clutch member 22 to engage the slanted surfaces of the lock portions 36 to thereby cause the locking mechanism 26 to rotate with the inner clutch member and relative to the outer clutch member 24 until the outer-clutch engaging surfaces 48 of the lock portions align with and abut the lock-receiving shoulders 44 of the outer clutch member. In addition to causing the locking mechanism 26 to rotate counterclockwise relative to the outer clutch member 24 as the locking mechanism is moved from its unlocked position to its locked position, the ramp portions 42 cause the lock portions 36 to move radially outwardly from the first radial distance $r_1$ (FIG. 3) to the second radial distance $r_2$ (FIG. 2). The cage 34 keeps the lock portions 36 equally spaced about the inner clutch member 22 as the locking mechanism 26 is moved between its unlocked and locked positions. Also preferably, the flexure elements slightly bias the lock portions 36 toward the locked positions. With the locking mechanism 26 in its locked position, further counterclockwise rotation of the inner clutch member 22 causes the outer clutch member 24 to rotate with the inner clutch member. Preferably, the flexure elements 40 are curved to provide a bit of compliance so that loads are transferred through the lock portions 36 and not the cage 34 during engaged running and load sharing among the locking elements is maximized. If the outer clutch member 24 of the present embodiment acts as the drive clutch member and the inner clutch member 22 acts as the driven clutch member, then the locking mechanism 26 is moved from its unlocked position to its locked position by clockwise movement (as viewed in FIGS. 2 and 3) of the outer clutch member relative to the inner clutch member. Fluid friction, seal friction, and inertial assist in moving the locking mechanism 26 from its unlocked position to its locked position.

During operation, counterclockwise rotation (as viewed in FIGS. 2 and 3) of the outer clutch member 24 relative to the inner clutch member 22 (which is the same as clockwise rotation of the inner clutch member relative to the outer clutch member) causes the locking mechanism 26 to rotate counterclockwise relative to the inner clutch member until the engaging surfaces 52 of the retaining portions 50 of the inner clutch member engage the retainer engageable surfaces 54 of the lock portions 36. Fluid and seal friction assist in driving the lock portions 36 onto the retaining portions 50. The retaining portions 50 of the inner clutch member 22 retain the lock portions in their unlocked positions during further overrunning of the clutch members.

Although the clutch mechanism 20 has been described as having lock portions 36 which move radially inwardly as the locking mechanism 26 is moved from its locked position to its unlocked position, it is to be understood that the clutch mechanism could alternatively be configured to have lock portions which move radially outwardly as the locking mechanism is moved from its locked position to its unlocked position without departing from the scope of the present invention. Also, although the locking mechanism 26 is described as having a cage body 38 and flexure elements 40 which keep the lock portions 36 equally spaced around the inner clutch member 22, it is to be understood that some other mechanism could be employed without departing from the scope of this invention (e.g., an appropriate cage could have guide slots rather than flexure elements to guide the lock portions between their locked and unlocked positions). Also, although not described in detail, it is to be understood that the inner and outer clutch members 22, 24 may be integral with other drive train components, such as gears or shafts.

In view of the above, it will be seen that several advantageous results are attained by the present invention.

As various changes could be made in the above constructions and methods without departing from the scope of the invention, it is intended that all matter contained in the above description or shown in the accompanying drawings shall be interpreted as illustrative and not in a limiting sense. The invention therefore shall be limited solely by the scope of the claims set forth below.

What is claimed is:

1. A positive locking overrunning clutch mechanism comprising:
    an inner clutch member adapted to rotate about a clutch axis;
    an outer clutch member adapted to rotate about the clutch axis;
    a locking mechanism having a plurality of lock portions adapted to transfer torque load from one of the inner and outer clutch members to the other of the inner and outer clutch members, said one of the inner and outer clutch members comprising a drive clutch member and said other of the inner and outer clutch members comprising a driven clutch member, the locking mechanism being moveable between a locked position and an unlocked position, the locked position being a position in which the lock portions simultaneously engage the drive clutch member and the driven clutch member in a manner to cause the driven clutch member to rotate with the drive clutch member upon rotation of the drive clutch member about the clutch axis in a first rotational direction, the unlocked position being a position in which the lock portions are positioned relative to the drive and driven clutch members in a manner to permit rotation of the driven clutch member relative to the drive clutch member in the first rotational direction, each lock portion being a first radial distance from the clutch axis when the locking mechanism is in the locked position, each lock portion being a second radial distance from the clutch axis when the locking mechanism is in the unlocked position;
    one of the drive and driven clutch members having a plurality of retaining portions adapted to engage the lock portions of the locking mechanism in a manner to positively maintain the locking mechanism in the unlocked position, wherein said one of the drive and driven clutch members and the retaining portions are a single, unitary member.

2. A positive locking overrunning clutch mechanism as set forth in claim 1 wherein the inner clutch member is the drive clutch member and the outer clutch member is the driven clutch member.

3. A positive locking overrunning clutch mechanism as set forth in claim 1 wherein the second radial distance is less than the first radial distance.

4. A positive locking overrunning clutch mechanism as set forth in claim 3 wherein the lock portions are radially spaced from the outer clutch member when the locking mechanism is in the unlocked position.

5. A positive locking overrunning clutch mechanism as set forth in claim 4 wherein the inner clutch member constitutes said one of the drive and driven clutch members having the plurality of retaining portions.

6. A positive locking overrunning clutch mechanism as set forth in claim 5 wherein each retaining portion includes an engaging surface generally facing the clutch axis and each of the lock portions includes a retainer engageable surface generally facing away from the clutch axis, the engaging surface of each retaining portion being adapted to abut the retainer engageable surface of a corresponding one of the lock portions to maintain the locking mechanism in the unlocked position.

7. A positive locking overrunning clutch mechanism as set forth in claim 1 wherein the locking mechanism further comprises a cage mechanism adapted to keep the lock portions equally spaced about the inner clutch member as the locking mechanism is moved between the locked and unlocked positions.

8. A positive locking overrunning clutch mechanism as set forth in claim 7 wherein the cage comprises a plurality of flexure elements, the flexure elements biasing the lock portions toward the locked position.

9. A positive locking overrunning clutch mechanism as set forth in claim 7 wherein the cage comprises a cage body and a plurality of flexure elements, each flexure element having a first end secured to the cage body and a second end secured to one of the lock portions, the second ends of the flexure elements moving relative to the cage body as the locking mechanism is moved between its locked and unlocked positions.

10. A positive locking overrunning clutch mechanism as set forth in claim 9 wherein the cage body and flexure elements are a single, unitary member.

11. A positive locking overrunning clutch mechanism as set forth in claim 1 wherein the entirety of the locking mechanism moves circumferentially relative to the drive member when the locking mechanism is moved from the locked position to the unlocked position, and the entirety of the locking mechanism moves circumferentially relative to the driven member when the locking mechanism is moved from the locked position to the unlocked position.

12. A positive locking overrunning clutch mechanism as set forth in claim 1 wherein when the locking mechanism is in the unlocked position and the drive and driven members are rotating relative to one and other, the lock portions are stationary relative to the retaining portions.

13. A positive locking overrunning clutch mechanism comprising:

an inner clutch member adapted to rotate about a clutch axis;

an outer clutch member adapted to rotate about the clutch axis, the outer clutch member circumscribing the inner clutch member;

a locking mechanism having a plurality of lock portions adapted to transfer torque load from the inner clutch member to the outer clutch member, the locking mechanism being moveable between a locked position and an unlocked position, the locked position being a position in which the lock portions simultaneously engage the inner and outer clutch members in a manner to cause the outer clutch member to rotate with the inner clutch member upon rotation of the inner clutch member about the clutch axis in a first rotational direction, the unlocked position being a position in which the lock portions are positioned relative to the inner and outer clutch members in a manner to permit rotation of the outer clutch member relative to the inner clutch member in the first rotational direction, each lock portion being a first radial distance from the clutch axis when the locking mechanism is in the locked position, each lock portion being a second radial distance from the clutch axis when the locking mechanism is in the unlocked position;

one of the inner and outer clutch members having a plurality of retaining portions adapted to engage the lock portions of the locking mechanism in a manner to positively maintain the locking mechanism in the unlocked position, wherein said one of the inner and outer clutch members and the retaining portions are a single, unitary member.

14. A positive locking overrunning clutch mechanism as set forth in claim 13 wherein the second radial distance is less than the first radial distance.

15. A positive locking overrunning clutch mechanism as set forth in claim 14 wherein the lock portions are radially spaced from the outer clutch member when the locking mechanism is in the unlocked position.

16. A positive locking overrunning clutch mechanism as set forth in claim 15 wherein the inner clutch member has the plurality of retaining portions.

17. A positive locking overrunning clutch mechanism as set forth in claim 16 wherein each retaining portion includes an engaging surface generally facing the clutch axis and each of the lock portions includes a retainer engageable surface generally facing away from the clutch axis, the engaging surface of each retaining portion being adapted to abut the retainer engageable surface of a corresponding one of the lock portions to maintain the locking mechanism in the unlocked position.

18. A positive locking overrunning clutch mechanism as set forth in claim 13 wherein the inner clutch member has an outer peripheral surface and the outer clutch member has an inner peripheral surface, each of the peripheral surfaces being non-circular as viewed in a cross-sectional plane perpendicular to the clutch axis.

19. A positive locking overrunning clutch mechanism as set forth in claim 13 wherein the locking mechanism further comprises a cage mechanism adapted to keep the lock portions equally spaced about the inner clutch member as the locking mechanism is moved between the locked and unlocked positions.

20. A positive locking overrunning clutch mechanism as set forth in claim 19 wherein the cage comprises a plurality of flexure elements, the flexure elements biasing the lock portions toward the locked position.

21. A positive locking overrunning clutch mechanism as set forth in claim 19 wherein the cage comprises a cage body and a plurality of flexure elements, each flexure element having a first end secured to the cage body and a second end secured to one of the lock portions, the second ends of the flexure elements moving relative to the cage body as the locking mechanism is moved between its locked and unlocked positions.

22. A positive locking overrunning clutch mechanism as set forth in claim 13 wherein the locking elements are non-spherical.

23. A positive locking overrunning clutch mechanism as set forth in claim 11 wherein the entirety of the locking mechanism moves circumferentially relative to the drive member when the locking mechanism is moved from the locked position to the unlocked position, and the entirety of the locking mechanism moves circumferentially relative to the driven member when the locking mechanism is moved from the locked position to the unlocked position.

24. A positive locking overrunning clutch mechanism as set forth in claim 13 wherein when the locking mechanism is in the unlocked position and the drive and driven members are rotating relative to one and other, the lock portions are stationary relative to the retaining portions.

* * * * *